Patented Aug. 14, 1928.

1,680,506

UNITED STATES PATENT OFFICE.

RALPH B. DERR, OF OAKMONT, PENNSYLVANIA, ASSIGNOR, BY MESNE ASSIGNMENTS, TO NATIONAL ALUMINATE CORPORATION, OF CHICAGO, ILLINOIS, A CORPORATION OF DELAWARE.

METHOD OF PURIFYING WATER.

No Drawing. Application filed September 20, 1927. Serial No. 220,839.

The invention relates to water purification processes in which water softening material or materials, including lime, soda ash, sodium hydroxide and other well known materials, are added to the water for precipitating the hardening materials or compounds contained in it, and in which sodium aluminate is added to form a coagulant for enveloping and removing this precipitate, and also for enveloping and removing turbidity and bacteria present in the water.

As is known by those familiar with the practice of such water purification processes, the addition of lime in sufficient amounts for the purpose precipitates the bicarbonates of magnesium and calcium, which are the principal chemical compounds that give to the water what is known as its temporary hardness. Similarly, it is known that the addition of soda ash in sufficient amounts for the purpose precipitates the magnesium and calcium sulphates, chlorides or nitrates, which are the principal chemical compounds that give to the water what is known as its permanent hardness. Accordingly, depending upon whether it is desired to remove only the temporary hardness, as is frequently done in the purification of water for municipal use, or to remove both temporary and permanent hardness, as is done in the treatment of water for industrial uses, as for example for use in steam generating boilers or for the manufacture of ice, lime alone, or both lime and soda ash are customarily added to water to be purified.

Either mixed with the water softening material, or separately, sodium aluminate is added to the water to form a coagulant for the purpose explained. In the use of sodium aluminate for this purpose it is necessary to substantially neutralize the bicarbonates present in the water before the coagulant will be produced, and this may be accomplished by the addition of an alkali, such as lime or caustic soda. Heretofore it has been generally supposed that the addition of sodium aluminate to any hard water having the proper degree of alkalinity would result in the formation of an adequate coagulant, although instances were found where a coagulant could not be so formed, which instances baffled those who were attempting to practice the processes.

The object of this invention is to so improve processes of water treatment of the character described that they may be applicable to the purification of waters which, because of the inability to form a coagulant from the sodium aluminate added to the water, have heretofore been incapable of purification.

The invention is predicated upon my discovery that in order to form a coagulant from sodium aluminate which is added to water for that purpose, it is essential not only that the bicarbonates be neutralized, but also that there be present in the water certain amounts of magnesium sulphate to produce both magnesium ions and sulphate ions. I have discovered that, in a hard water which contains less than about twenty-five parts per million of magnesium sulphate, no coagulant is formed by the addition of sodium aluminate to the water, regardless of the amount of sodium aluminate which may be added. By adding magnesium sulphate, or its equivalent to water containing less than about twenty-five parts per million of magnesium sulphate, and to which sodium aluminate has been added for the purpose of forming a coagulant, I have found that a cloudy precipitate, but nevertheless an ineffective coagulant, begins to form when the water content of magnesium sulphate rises above about twenty-five parts per million, and that this coagulation increases gradually until the water content of magnesium sulphate reaches about fifty parts per million. In this concentration of magnesium sulphate a satisfactory coagulant is formed from the sodium aluminate.

This invention therefore comprises the purification of water containing less than about fifty parts per million of magnesium sulphate by mixing with the water lime or soda ash, or both, or their equivalents, for precipitating the hardening materials found in the water; adding sodium aluminate to the water for forming a coagulant; and activating the formation of a coagulant from the sodium aluminate by adding to the water a material capable of producing magnesium ions and sulphate ions. These materials may be added in any desired order of sequence, or as various mixtures of any two or more of them. The activating material so added may be, and preferably is, magnesium sulphate, although it may also be an equivalent thereof such as magnesium chloride and sodium sulphate. Whatever is added for so activating the formation of a coagulant, I have found that it must be capable of producing both sulphate and magnesium ions.

It is my belief that the addition of magnesium sulphate to water containing sodium aluminate results in the formation of sodium sulphate, aluminum hydroxide and magnesium hydroxide, the latter two, and particularly the aluminum hydroxide, being a coagulant. This reaction may take place as follows:

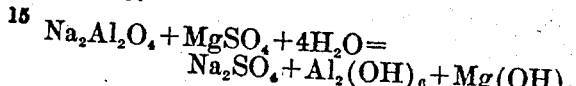

$$Na_2Al_2O_4 + MgSO_4 + 4H_2O = Na_2SO_4 + Al_2(OH)_6 + Mg(OH)_2$$

However, regardless of what reaction or reactions take place, and regardless of what may be the exact ultimate nature of the coagulant, I have found that for forming a satisfactory coagulant from sodium aluminate in waters containing less than about fifty parts per million of magnesium sulphate, it is necessary to add to the water such material or materials as will raise the concentration of magnesium sulphate in the water to or above fifty parts per million.

Because magnesium sulphate constitutes a portion of the permanent hardness of most raw waters, its addition to water in water purification treatments produces a result contrary to expectation. The purpose of such treatment is to decrease hardness and it would be expected that the addition of magnesium sulphate to water being treated would either increase its hardness or require the use of an excess amount of water softening material. However, I have found that the addition of magnesium sulphate, or its equivalent, does not increase the hardness of water, and that where water is deficient in magnesium ions and sulphate ions, the concentration of these ions must be increased in order to precipitate the alumina from the sodium aluminate in the form of an enveloping coagulant.

The invention will be further explained by reference to some of the tests which I have made. The following series of tests demonstrate the necessity of adding both magnesium ions and sulphate ions to cause sodium aluminate to form a coagulant. The addition to 500 cc. of distilled water of one grain per gallon of sodium aluminate and two grains per gallon of 90% lime, produced no precipitation of the sodium aluminate. To 500 cc. of distilled water there was added 107 parts per million of magnesium chloride, one grain per gallon of sodium aluminate, and two grains per gallon of 90% lime with the result that the water became milky in appearance due to the change in the sodium aluminate, but no effective coagulation took place. Likewise no coagulation was produced by the addition of two grains per gallon of 90% lime and one grain per gallon of sodium aluminate to 500 cc. of distilled water containing 500 parts per million of sodium sulphate. However, when from 50 to 200 parts per million of magnesium sulphate was added to 500 cc. of distilled water and the resultant solution treated with one grain per gallon of sodium aluminate and two grains per gallon of 90% lime, an excellent coagulant was produced. Similarly the addition of magnesium chloride and sodium sulphate produced the same result, this combination being equivalent to magnesium sulphate in that it produces both magnesium ions and sulphate ions in solution.

As an example of the practice of this invention, and of the results obtained by it, reference is made to a raw water which was found to be particularly refractory to purifying treatments, for its turbidity was such that none of the well known coagulants were effective. Furthermore none of the sodium aluminate treatments previously known were in any way successful in treating the water because no coagulant could be produced. The composition of this water was as follows:

|  | Parts per million. |
|---|---|
| Carbonate hardness | 11.9 |
| Non-carbonate hardness | 38.8 |
| Calcium | 7.0 |
| Total magnesium | 7.2 |

It is noted that the total magnesium content of this water was only 7.2 parts per million, and accordingly that the maximum content of magnesium sulphate could not have been more than about 35 parts per million. Actually the magnesium sulphate content of this water was lower than this value, inasmuch as magnesium in natural waters is generally present not only as sulphate, but also in the form of other salts, such as bicarbonate, so that the magnesium sulphate concentration was too low to produce the desired coagulation. A water may contain a very large amount of sulphate in the form of calcium sulphate, for example, and also a large amount of magnesium in the form of a salt other than sulphate, but no effective coagulation will take place until the concentration of magnesium sulphate is sufficiently increased. The reason for this is probably that the calcium sulphate does not ionize sufficiently to produce the necessary concentration of sulphate ion.

After many unsuccessful attempts to treat this water to remove its natural turbidity there was added to it one grain per gallon of sodium aluminate, eight grains per gallon of sodium hydroxide, and one grain per gallon of magnesium sulphate which raised its content of magnesium sulphate above fifty parts per million. No precipitation occurred until the magnesium sulphate was added, but after its addition a rapid coagulation took place which completely removed its natural turbidity and that produced by the addition of sodium hydroxide and left the water clear. Furthermore, the removal of the turbidity was accomplished in eight hours while other treatments which were tried were not successful even after the water had stood for twenty-four hours after the addition of purifying materials.

The sodium aluminate used in the practice of this invention may be either a dry product or in the form of solution, both forms being commercially known and readily available. Whether a dry product or in the form of a solution, the sodium aluminate need not be pure. It is preferred to use a dry product such as that made by sintering a mixture of bauxite or other aluminous material with soda ash and a carbonaceous fuel in such a manner as to produce a porous granular product containing a high content of water-soluble alumina. In addition to its content of such alumina, this product also contains the iron, titanium, and silicon found in the bauxite, these metals being mixed with the sodium aluminate in the form of their oxides or all or in part as sodium ferrite, sodium titanate and sodium silicate.

It will be readily understood that in the practice of this invention various waters require the addition of different amounts of water purifying materials because few waters are identical with reference to the character and amount of their contents of hardening compounds. Therefore the examples which have been given are by way of illustrating the invention and are not to be taken as limiting the amounts of reagents used.

According to the provisions of the patent statutes, I have explained the principle and mode of operation of my invention, and have given specific examples of the manner in which it may be practiced. However, I desire to have it understood that, within the scope of the appended claims, the invention may be practiced otherwise than as specifically described.

I claim as my invention:

1. The method of purifying water containing less than about fifty parts per million of magnesium sulphate, comprising mixing with the water a water-softening compound and sodium aluminate, and activating the formation of a coagulant from the sodium aluminate by adding to the water a material capable of producing magnesium ions and sulphate ions.

2. The method of purifying water containing less than about fifty parts per million of magnesium sulphate, comprising mixing with the water a water softening compound and sodium aluminate, and activating the formation of a coagulant from the sodium aluminate by adding magnesium sulphate to the water.

3. The method of purifying water containing less than about fifty parts per million of magnesium sulphate, comprising mixing lime and sodium aluminate with the water, and activating the formation of a coagulant from the sodium aluminate by adding to the water a material capable of producing magnesium ions and sulphate ions.

4. The method of purifying water containing less than about fifty parts per million of magnesium sulphate, comprising mixing lime and sodium aluminate with the water, and activating the formation of a coagulant from the sodium aluminate by adding magnesium sulphate to the water.

5. The method of purifying water containing less than about fifty parts per million of magnesium sulphate, comprising mixing with the water a water-softening compound and sodium aluminate, and activating the formation of a coagulant from the sodium aluminate by adding to the water a material capable of producing magnesium ions and sulphate ions, said material being added in an amount sufficient to produce a concentration of not less than fifty parts per million of magnesium sulphate in the water.

6. The method of purifying water containing less than fifty parts per million of magnesium sulphate, comprising mixing with the water a water-softening compound and sodium aluminate, and activating the formation of a coagulant from the sodium aluminate by adding to the water sufficient magnesium sulphate to produce in the water a concentration of not less than about fifty parts per million of magnesium sulphate.

In testimony whereof, I sign my name.

RALPH B. DERR.